US012794528B1

(12) United States Patent
Thompson et al.

(10) Patent No.: US 12,794,528 B1
(45) Date of Patent: Nov. 10, 2026

(54) ACCESS POINT ANTENNA MATCHING WITH CORRELATED AND UNCORRELATED TRANSMISSION MODES

(71) Applicant: Amazon Technologies, Inc., Seattle, WA (US)

(72) Inventors: Ryan N. Thompson, Brooklyn, NY (US); Peter Willis Lane, San Francisco, CA (US); Benjamin Jeffrey Lowe, South San Francisco, CA (US); Sudheer Kumar Suryadevara, San Jose, CA (US); Eric Johnson, Mahone Bay (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/920,265

(22) Filed: Oct. 18, 2024

Related U.S. Application Data

(60) Provisional application No. 63/591,706, filed on Oct. 19, 2023.

(51) Int. Cl.
*H04B 7/06* (2006.01)

(52) U.S. Cl.
CPC .................................. *H04B 7/0617* (2013.01)

(58) Field of Classification Search
CPC ............................ H04B 7/0413; H04B 7/0617
USPC .......................................................... 375/267
See application file for complete search history.

(56) References Cited

U.S. PATENT DOCUMENTS

| | | | | |
|---|---|---|---|---|
| 2018/0248600 | A1* | 8/2018 | Kasher | H04B 7/0632 |
| 2021/0337054 | A1* | 10/2021 | Choi | H01Q 1/243 |
| 2022/0173784 | A1* | 6/2022 | Gao | H04B 7/0404 |
| 2024/0031003 | A1* | 1/2024 | Khoury | H04B 7/0617 |
| 2024/0129013 | A1* | 4/2024 | Zhu | H04B 7/0404 |

OTHER PUBLICATIONS

Martin, "Directional Gain of IEEE 802.11 MIMO Devices Employing Cyclic Delay Diversity," Technical Research Branch Laboratory Division Office of Engineering and Technology Federal Communications Commission, Apr. 5, 2013, 48 pages.

* cited by examiner

*Primary Examiner* — Sam K Ahn
(74) *Attorney, Agent, or Firm* — Kilpatrick Townsend & Stockton LLP

(57) ABSTRACT

An access point includes a plurality of antennas and a hardware processor. The hardware processor determines a number of antennas of a first wireless network device and causes the access point to transmit first data streams to the first wireless network device using a matching number of antennas. Thereafter, the hardware processor determines a number of antennas of a second wireless network device having fewer antennas than the first wireless network device and causes the access point to place a matching number of antennas into an active state and each remaining antenna into an idle state. The hardware processor causes the access point to transmit second data streams to the second wireless network device using the activated antennas.

20 Claims, 12 Drawing Sheets

ACCESS POINT ANTENNA MATCHING WITH CORRELATED AND UNCORRELATED TRANSMISSION MODES

CROSS-REFERENCE TO RELATED APPLICATIONS

This non-provisional application claims priority to and the benefit of U.S. Provisional Application No. 63/591,706, filed on Oct. 19, 2023, and titled "METHOD AND SYSTEM FOR RADIO COMMUNICATIONS," the content of which is herein incorporated in its entirety for all purposes.

BACKGROUND

A wireless network is a computer network that uses wireless data connections between devices. A wireless network enables computers, smartphones, tablets, and IoT (Internet of Things) devices to connect to the internet and communicate with each other without the need for physical wired connections. An access point (AP) is a device operating within a wireless network that serves as the bridge between a wired network infrastructure (such as Ethernet) and wireless client devices. Access points transmit and receive radio frequency (RF) signals to and from wireless devices. In some cases, access points broadcast network availability through beacon frames, handle the authentication and association of client devices, manage data traffic, and provide security features such as encryption and access control.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
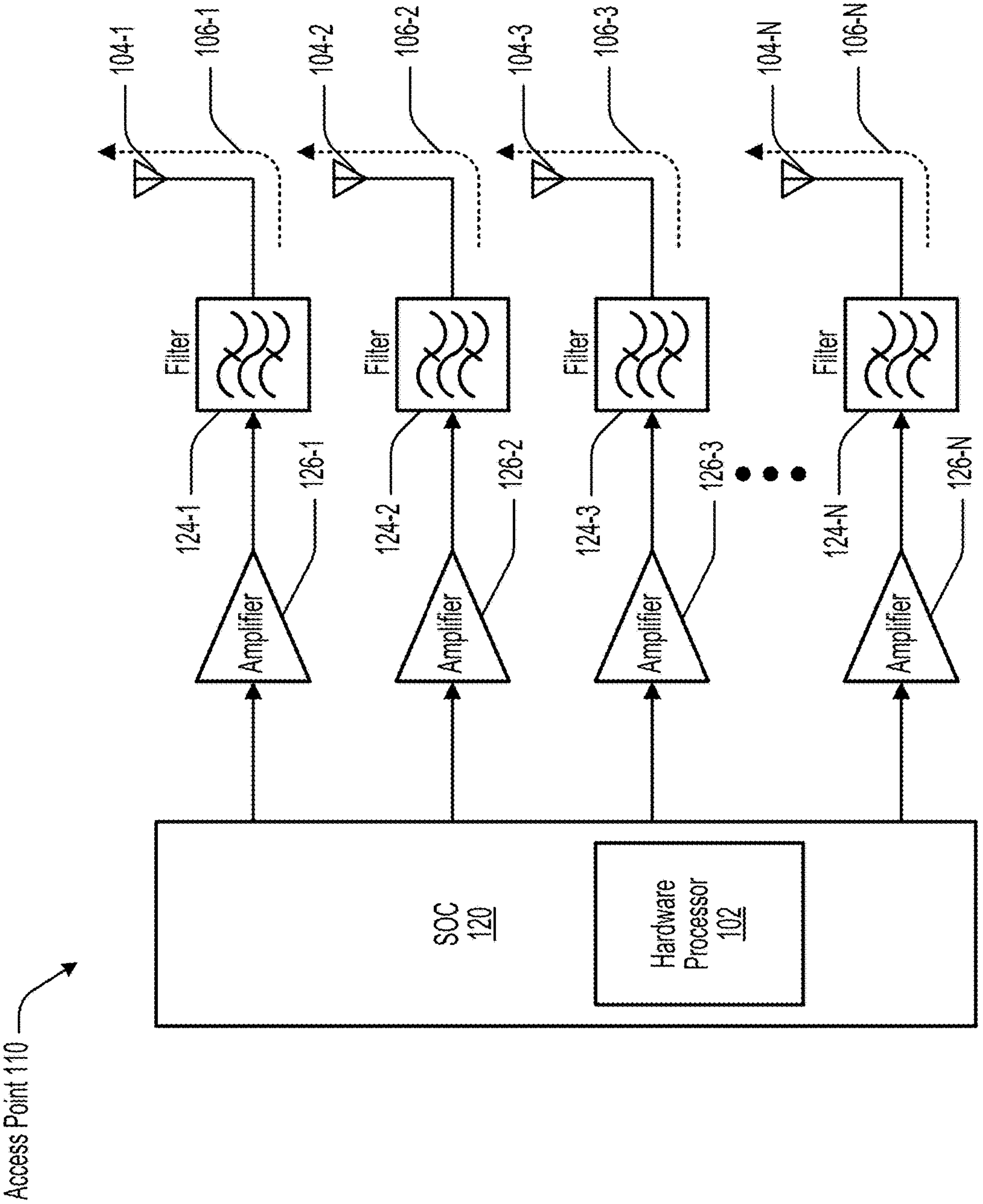
FIG. 1 illustrates an example block diagram of an access point.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION

The range of an access point (AP) in a wireless network is influenced by the transmit power at each of the access point's antennas. The transmit power, which is usually measured in milliwatts (mW) or decibels relative to a milliwatt (dBm), is the electrical power applied to an antenna to transmit radio-frequency (RF) signals. As RF signals from the access point's antennas propagate through the air, they diminish in strength as they travel further from the source. The higher the transmit power, the further the signals can travel before they attenuate to levels that are no longer usable by a recipient device. Thus, increasing transmit power effectively increases the coverage area of the access point.

Regulatory bodies like the Federal Communications Commission (FCC) in the United States set limits on the maximum transmit power for wireless devices to prevent excessive interference and ensure fair spectrum usage. Access points must comply with these limits, which can constrain their maximum range. Different frequency channels have different regulatory power limits. For example, for Wi-Fi networks, the 2.4 GHz band typically has lower power limits compared to the 5 GHz band, affecting the range achievable on each band. Furthermore, the FCC sets different power limits transmitted from multiple antennas based on whether the transmitted signals are correlated or uncorrelated. The FCC distinguishes between these types of signals in part to ensure that transmissions do not cause undue interference.

Correlated signals refer to signals that have a fixed or predictable relationship with each other. This correlation can occur in various forms, such as having a constant phase relationship, identical modulation, or synchronized timing (e.g., a fixed time offset between the signals). One example of correlated signals can include signals generated using beamforming, where multiple antennas transmit the same signal but with specific phase adjustments to direct the signal energy towards a particular direction. The signals are highly correlated in this scenario. Other examples include multiple input multiple output antenna configurations in which the signals from different antennas might be correlated to improve signal strength and reliability through techniques like spatial multiplexing. In contrast, signals are considered to be uncorrelated if no correlation can be found. Examples of uncorrelated signals include space-time block codes (STBC) or space-time codes (STC) in which different digital data is carried by each transmit antenna during any symbol period (e.g., WiMAX Matrix A) or spatial multiplexing MIMO in which independent data streams are sent to each transmit antenna (e.g., WiMAX Matrix B). WiMAX Matrix C, which adds diversity, also produces uncorrelated transmit signals.

The FCC considers the effective isotropic radiated power (EIRP) of the access point's antenna(s) for both correlated and uncorrelated signals. However, the methodology for calculating EIRP and the applicable power limits can differ based on the nature of the signals. For correlated signals, the FCC typically requires that the combined EIRP of all the antennas be considered. For uncorrelated signals, the FCC may allow higher aggregate power levels. This is because uncorrelated signals do not combine in the same way as correlated signals and are less likely to create strong interference patterns. Each antenna's power is considered separately, and the total power across all antennas can be higher than for correlated signals.

Embodiments of the present invention exploit correlation-based power limits and employ antenna matching between transmitter and receiver to extend the range of wireless access points. An example access point may switch between operating in accordance with uncorrelated and correlated transmission modes. While in the uncorrelated transmission mode, the access point may determine the number of antennas included in the recipient device and place a matching number of antennas into an active state. These activated antennas are used to transmit one or more data streams to the recipient device. Remaining antennas are placed in an idle state using various hardware control, software logic, or signal processing mechanisms. Beacon frames may be transmitted using a single antenna at predetermined intervals (e.g., 100 ms). While in the correlated transmission mode, the access point may use all antennas to transmit data streams regardless of the number of antennas included in the recipient device. Upon switching from the correlated to the uncorrelated transmission mode, the access point may increase the transmit power of each antenna placed in the active state. With the increased power, the access point is able to increase its range and accordingly the range of the wireless network.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example block diagram of an access point 110, in accordance with some embodiments of the present invention. Access point 110 is a networking device that allows wireless devices to connect to a wired network using Wi-Fi or other wireless communication standards, thereby creating a wireless network. Access point 110 may serve as a bridge between wireless client devices operating within the wireless network (such as laptops, smartphones, tablets, and other Wi-Fi-enabled devices) and the wired network, often a local area network (LAN). Access point 110 may extend the coverage area of the network, allowing wireless devices to connect from various locations within the coverage area. In some examples, a wireless mesh network may be formed by access point 110 in addition to one or more similar access points. Adding more access points to the wireless mesh network can allow the network to scale efficiently as the number of users and devices grows.

In the illustrated example, access point 110 includes a plurality of antennas 104 designed to receive and/or transmit signals 106 within one or more specific frequency bands relevant to modern wireless communication standards, such as Wi-Fi, LTE, or 5G. The inclusion of multiple antennas facilitates multiple-input multiple-output (MIMO) technology, which enhances data throughput and link reliability by utilizing spatial diversity. Each of antennas 104 is arranged in a respective transmit chain and is connected to a respective one of filters 124, which is tailored to pass signals within the desired frequency band while attenuating out-of-band noise and interference. Filters 124 ensure that only the relevant frequency components reach the subsequent stages.

Each of antennas 104 is further connected to a respective one of amplifiers 126, which may amplify the signals that are input into filters 124 (as shown in the illustrated example) or amplify the filtered signals. Amplifiers 126 are designed to increase the signal strength of signals 106 transmitted by antennas 104 without introducing significant noise or distortion. This amplification step can be important for maintaining a robust wireless link, especially in environments with high path loss or significant interference. While the example shown in FIG. 1 includes four antennas 104, four filters 124, and four amplifiers 126, it is to be understood that access point 110 may include greater or fewer numbers of antennas, filters, and amplifiers, such that N=2, 4, 6, 8, 10, 16, 32, or 64, among other possibilities.

Access point 110 may include a system on chip (SOC) 120 coupled to each of antennas 104 through the respective transmit chains. SOC 120 may include a hardware processor 102 and an associated memory. SOC 120 may be responsible for managing the operations of access point 110, including signal processing, data routing, and handling communication protocols. Hardware processor 102 may execute complex algorithms for tasks such as beamforming, interference suppression, and error correction, further enhancing the system's performance and reliability. Although shown in FIG. 1 as a singular element, it is to be understood that hardware processor 102 may include one or more processors or processor cores implemented in a modern computing architecture.

As described herein, during operation of access point 110, hardware processor 102 may detect a number/quantity of antennas being used by a wireless network device and in response cause a matching number of antennas from antennas 104 to be placed in an active state and any remaining antennas from antennas 104 to be placed in an idle state. For example, in response to detecting that a number of antennas being used by a wireless network device is equal to two, hardware processor 102 may cause two of antennas 104 to be placed into an active state (e.g., antennas 104-1 and 104-2) and two of antennas 104 to be placed into an idle state (e.g., antennas 104-3 and 104-4, where N=4). To place the antennas into an idle state, hardware processor 102 may, for example, prevent signals 106 from being generated along the transmit chains for antennas 104-1 and 104-2, control the power supply to the antennas or their associated RF components to effectively power down antennas 104-1 and 104-2, control RF switches to disconnect antennas 104-1 and 104-2 from RF circuitry, among other possibilities. Accordingly, hardware processor 102 may place one or more of antennas 104 into an idle state using various hardware control, software logic, or signal processing mechanisms.

Figure 2A:
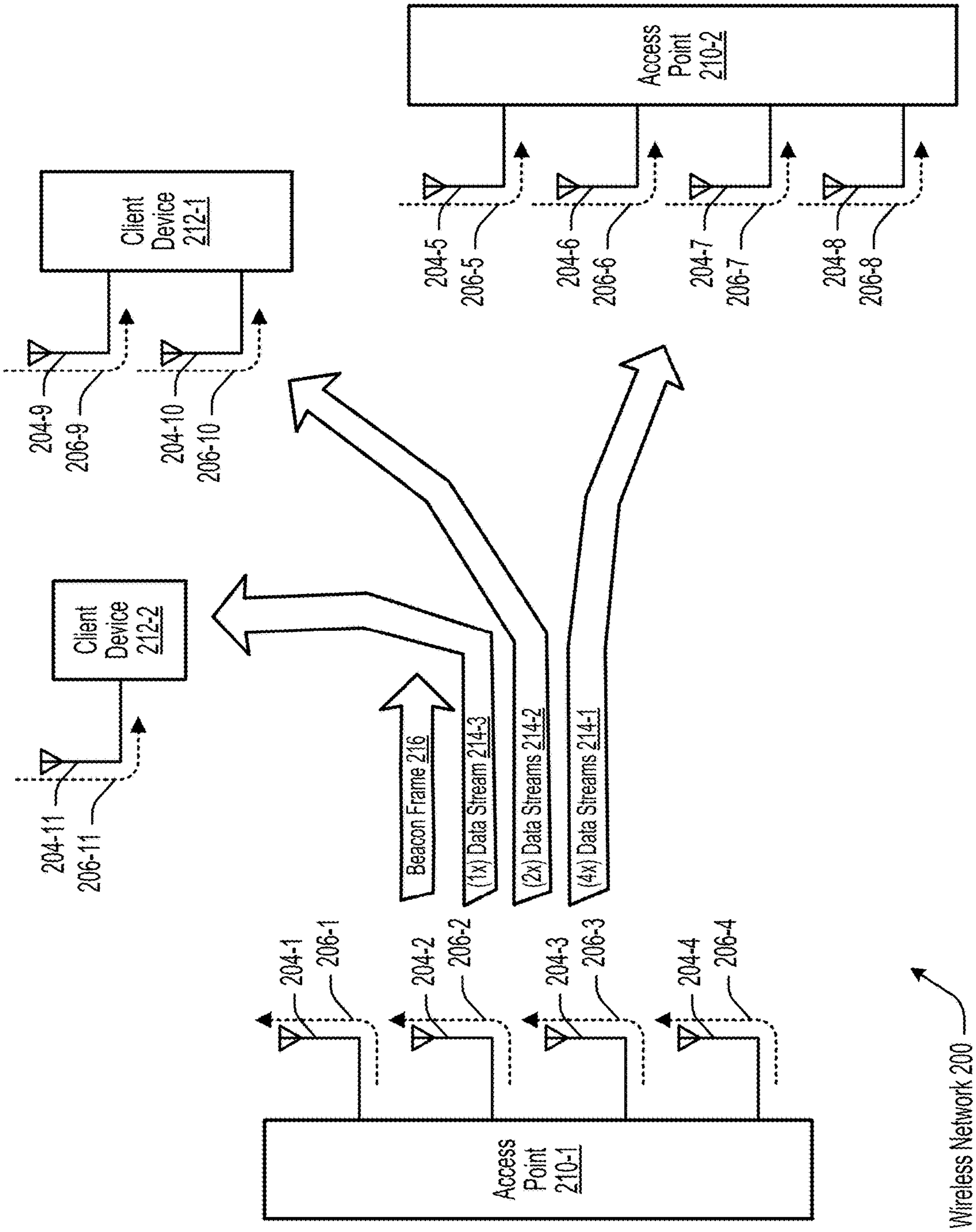
FIG. 2A illustrates an example wireless network that includes various devices operating therein.

FIG. 2A illustrates an example wireless network 200 that includes various devices (or "wireless network devices") operating therein, including an access point 210-1, an access point 210-2, a client device 212-1, and a client device 212-2, in accordance with some embodiments of the present invention. Access point 210-2 may be alternatively referred to herein as a "first wireless network device", client device 212-1 as a "second wireless network device", and client device 212-2 as a "third wireless network device". In the illustrated example, access point 210-1 includes four antennas 204-1, 204-2, 204-3, and 204-4, access point 210-2 includes four antennas 204-5, 204-6, 204-7, and 204-8, client device 212-1 includes two antennas 204-9 and 204-10, and client device 212-2 includes antenna 204-11. Other numbers of antennas for access points 210 and client devices 212 are contemplated and are considered to be within the scope of the present invention.

Access point 210-1 may use antennas 204-1, 204-2, 204-3, and 204-4 to respectively transmit signals 206-1, 206-2, 206-3, and 206-4 to one or more of access point 210-2, client device 212-1, and client device 212-2. The transmitted signals pass through a propagation channel and arrive at access point 210-2 as signals 206-5, 206-6, 206-7, and 206-8 respectively received by antennas 204-5, 204-6, 204-7, and 204-8. The transmitted signals may alternatively or additionally arrive at client device 212-1 as signals 206-9 and 206-10 respectively received by antennas 204-9 and 204-10. The transmitted signals may alternatively or additionally arrive at client device 212-2 as signals 206-11 received by antenna 204-11.

The transmitted signals may be used to sequentially communicate data streams 214 to access point 210-2 and client devices 212. When access point 210-1 is operating in accordance with an uncorrelated transmission mode, the number of antennas of the recipient device (e.g., access point 210-2, client devices 212) determines the number of data streams that may be communicated and the number of antennas that are set to active or idle states on access point 210-1. In some examples, access point 210-1 may transmit four data streams 214-1 to access point 210-2 during a first time window, two data stream 214-2 to client device 212-1 during a second time window after or before the first time window, and a single data stream 214-3 to client device 212-2 during a third time window after, before, or between the first and second time windows.

In addition to data streams 214, transmitted signals 206-1 to 206-4 may be used to communicate a beacon frame 216 to access point 210-2, client devices 212, and other wireless network devices operating within wireless network 200. Beacon frames are special types of management frames that may be periodically transmitted by access point 210-1 (as well as access point 210-2) to announce the presence of wireless network 200. Beacon frames play an important role in the operation and management of Wi-Fi networks. Beacon frame 216 may be broadcasted to all devices within the range of access point 210-1, and may not be directed to any specific device, making such frames connectionless. In some examples, beacon frame 216 may be transmitted every 100 milliseconds. Beacon frame 216 may contain the Service Set Identifier (SSID), which is the name of wireless network 200, as well as supported data rates, channel information, security information, and timing information.

Figure 2C:
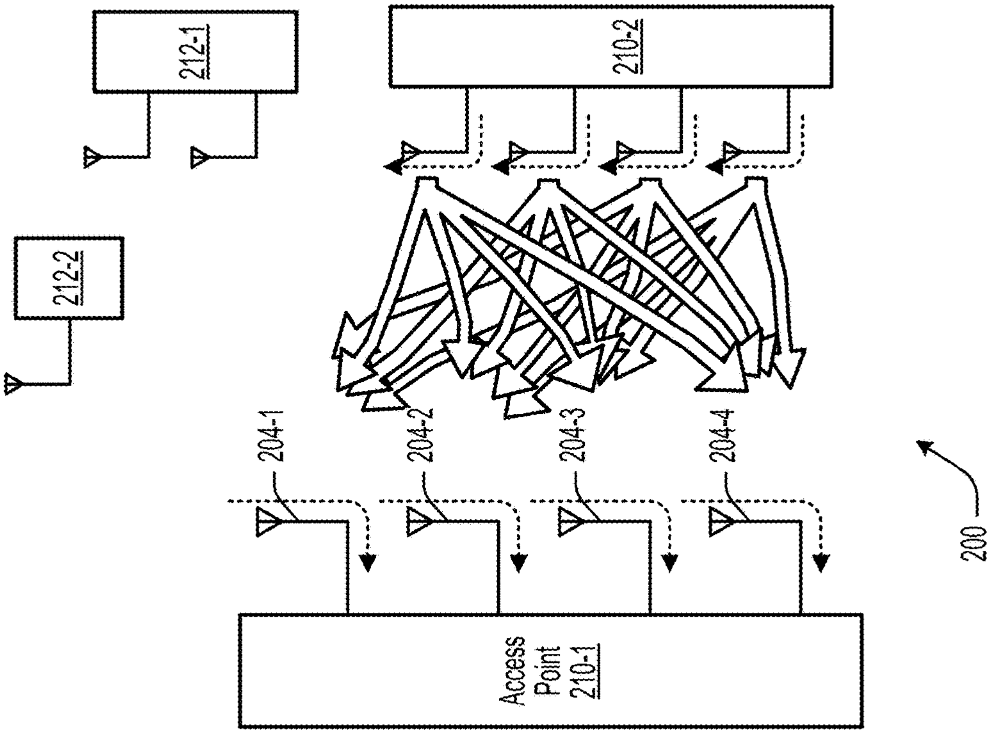
FIG. 2C illustrates an example reception of data streams by a first access point from a second access point.
Figure 2B:
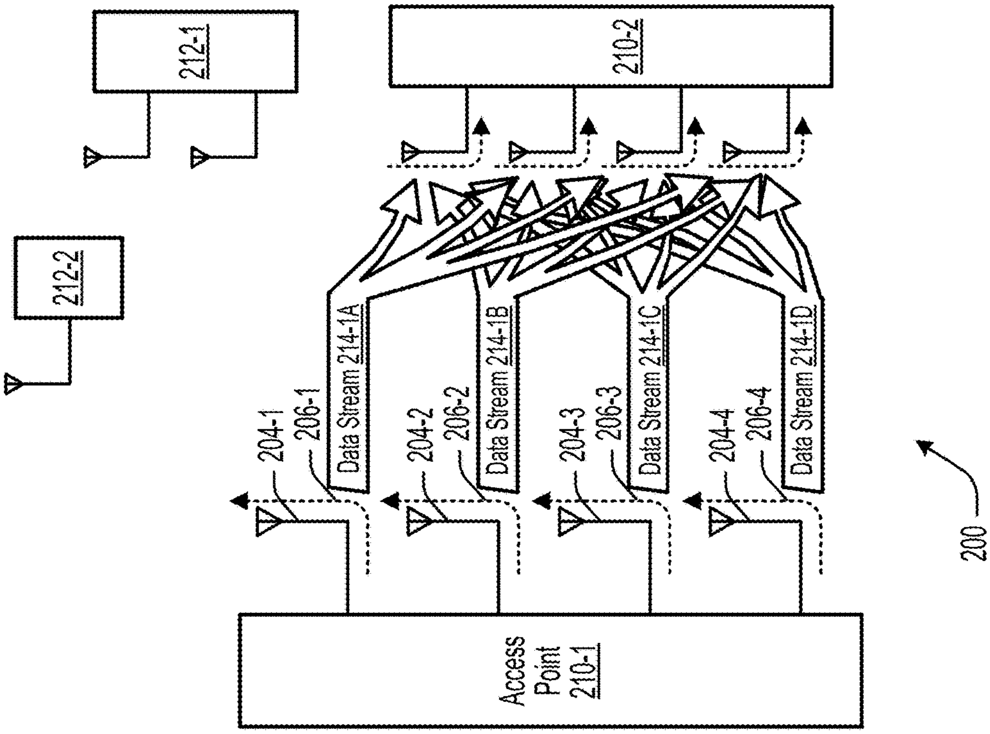
FIG. 2B illustrates an example transmission of data streams from a first access point to a second access point while the first access point is operating in accordance with an uncorrelated transmission mode.

FIG. 2B illustrates an example transmission of data streams 214-1 from access point 210-1 to access point 210-2 while access point 210-1 is operating in accordance with an uncorrelated transmission mode, in accordance with some embodiments of the present invention. Prior to transmission of any data streams, access point 210-1 may determine the total number of antennas included in access point 210-2. Upon determining that access point 210-2 includes four antennas, access point 210-1 may place each of antennas 204-1 to 204-4 into an active state. Access point 210-1 may then use antennas 204-1 to 204-4 to respectively transmit signals 206-1 to 206-4 to respectively communicate data streams 214-1A to 214-1D to access point 210-2. Each of signals 206-1 to 206-4 may be uncorrelated with each other. In the illustrated example, each of signals 206-1 to 206-4 may be received by each of antennas 204-5 to 204-8 in a multiple-input and multiple-output (MIMO) antenna arrangement. Signal processing at access point 210-2 may be performed to recover each of data streams 214-1A to 214-1D.

FIG. 2C illustrates an example reception of data streams by access point 210-1 from access point 210-2, in accordance with some embodiments of the present invention. Similar to that described in reference to FIG. 2B, prior to transmission of any data streams, access point 210-2 may determine the total number of antennas included in access point 210-1. Upon determining that access point 210-1 includes four antennas, access point 210-2 may place each of antennas 204-5 to 204-8 into an active state. Access point 210-2 may then use antennas 204-5 to 204-8 to transmit signals to communicate data streams to access point 210-1. Each of the transmitted signals may be uncorrelated with each other and each may be received by each of antennas 204-1 to 204-4 in a MIMO antenna arrangement. Signal processing at access point 210-1 may be performed to recover each of the transmitted data streams.

Figure 2D:
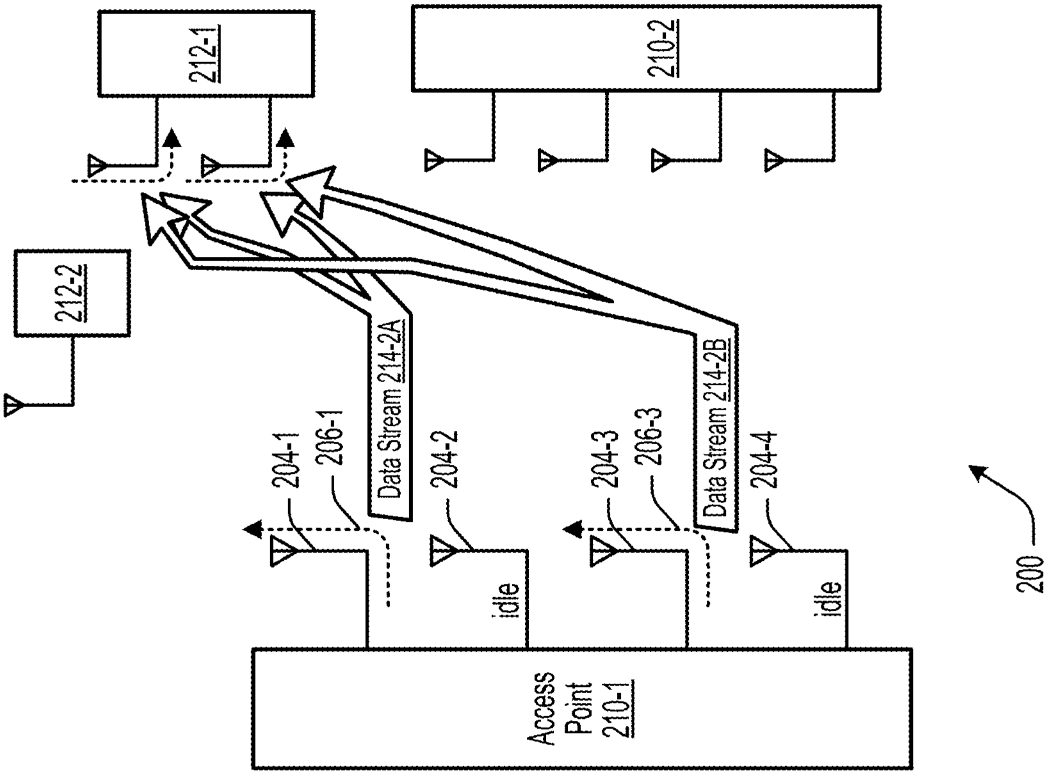
FIG. 2D illustrates an example transmission of data streams from a first access point to a client device while the first access point is operating in accordance with an uncorrelated transmission mode.

FIG. 2D illustrates an example transmission of data streams 214-2 from access point 210-1 to client device 212-1 while access point 210-1 is operating in accordance with an uncorrelated transmission mode, in accordance with some embodiments of the present invention. Prior to transmission of any data streams, access point 210-1 may determine the total number of antennas included in client device 212-1. Upon determining that client device 212-1 includes two antennas, access point 210-1 may place antennas 204-1 and 204-3 into an active state and antennas 204-2 and 204-4 into an idle state (e.g., by switching the states of antennas 204-2 and 204-4 when transitioning from the configuration of FIG. 2C). Access point 210-1 may then use antennas 204-1 and 204-3 to respectively transmit signals 206-1 and 206-3 to respectively communicate data streams 214-2A and 214-2B to client device 212-1. Signals 206-1 and 206-3 may be uncorrelated with each other. Each of signals 206-1 and 206-3 may be received by each of antennas 204-9 and 204-10 in a MIMO antenna arrangement. Signal processing at client device 212-1 may be performed to recover each of data streams 214-2A and 214-2B.

Figure 2E:
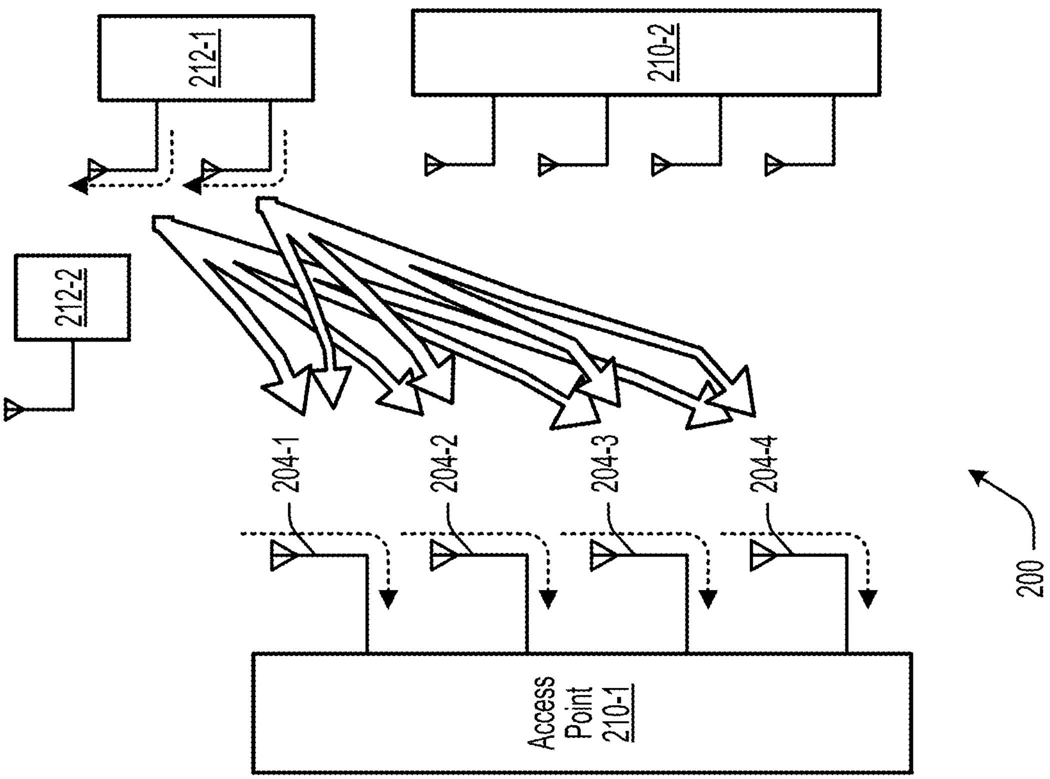
FIG. 2E illustrates an example reception of data streams by an access point from a client device.

FIG. 2E illustrates an example reception of data streams by access point 210-1 from client device 212-1, in accordance with some embodiments of the present invention. Prior to transmission of any data streams, client device 212-1 may determine the total number of antennas included in access point 210-1. Upon determining that access point 210-1 includes four antennas, client device 212-1 may place each of antennas 204-9 and 204-10 into an active state. Client device 212-1 may then use antennas 204-9 and 204-10 to transmit signals to communicate data streams to access point 210-1. Each of the transmitted signals may be uncorrelated with each other and each may be received by each of antennas 204-1 to 204-4 in a MIMO antenna arrangement. In preparation to receive the signals, access point 210-1 may place each of antennas 204-1 to 204-4 into an active state (e.g., by switching the states of antennas 204-2 and 204-4 when transitioning from the configuration of FIG. 2D). Signal processing at access point 210-1 may be performed to recover each of the transmitted data streams.

Figure 2G:
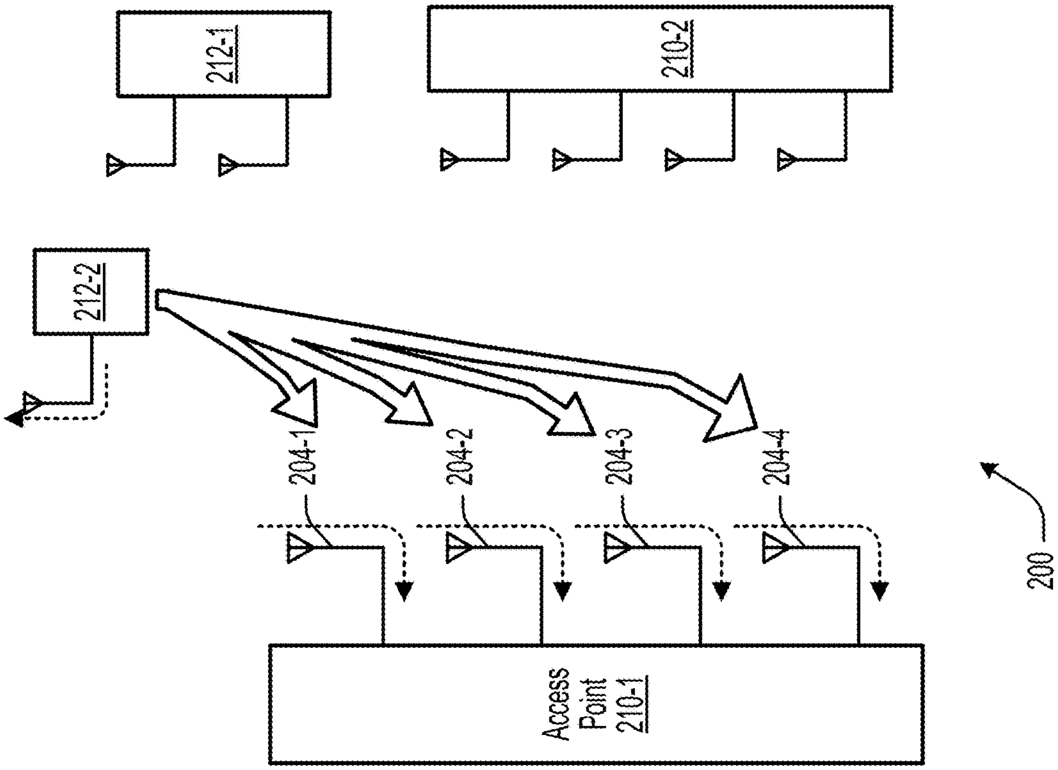
FIG. 2G illustrates an example reception of data streams by an access point from a client device.
Figure 2F:
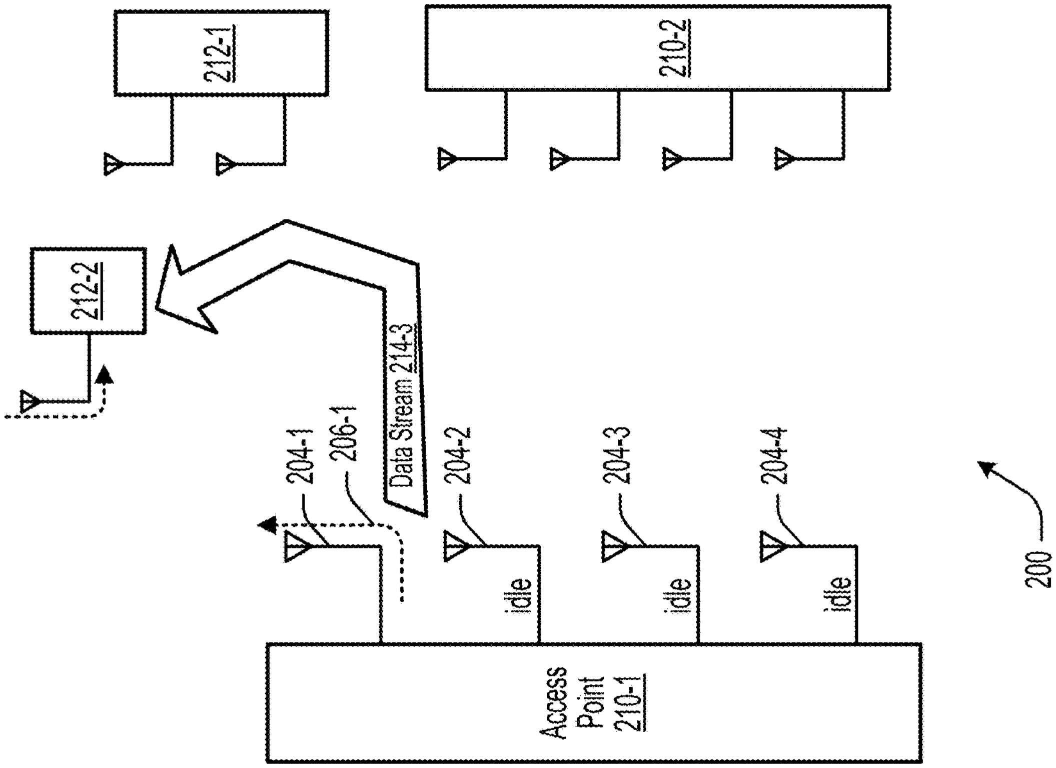
FIG. 2F illustrates an example transmission of a data stream from an access point to a client device while the access point is operating in accordance with an uncorrelated transmission mode.

FIG. 2F illustrates an example transmission of a data stream 214-3 from access point 210-1 to client device 212-2 while access point 210-1 is operating in accordance with an uncorrelated transmission mode, in accordance with some embodiments of the present invention. Prior to transmission of any data streams, access point 210-1 may determine the total number of antennas included in client device 212-2. Upon determining that client device 212-2 includes a single antenna, access point 210-1 may place antenna 204-1 into an active state and antennas 204-2, 204-3, and 204-4 into an idle state (e.g., by switching the states of antennas 204-2, 204-3, and 204-4 when transitioning from the configuration of FIG. 2E). Access point 210-1 may then use antenna 204-1 to transmit signal 206-1 to communicate data stream 214-3 to client device 212-2. Signal 206-1 may be received by antenna 204-11 in a single-input single-output (SISO) antenna arrangement. Signal processing at client device 212-2 may be performed to recover data stream 214-3.

FIG. 2G illustrates an example reception of data streams by access point 210-1 from client device 212-2, in accordance with some embodiments of the present invention. Client device 212-2 may then use antenna 204-11 to transmit a signal to communicate a data stream to access point 210-1. The transmitted signal may be received by each of antennas 204-1 to 204-4 in a single-input multiple-output (SIMO) antenna arrangement. In preparation to receive the signals, access point 210-1 may place each of antennas 204-1 to 204-4 into an active state (e.g., by switching the states of antennas 204-2, 204-3, and 204-4 when transitioning from the configuration of FIG. 2F). Signal processing at access point 210-1 may be performed to recover the transmitted data stream.

Figure 2H:
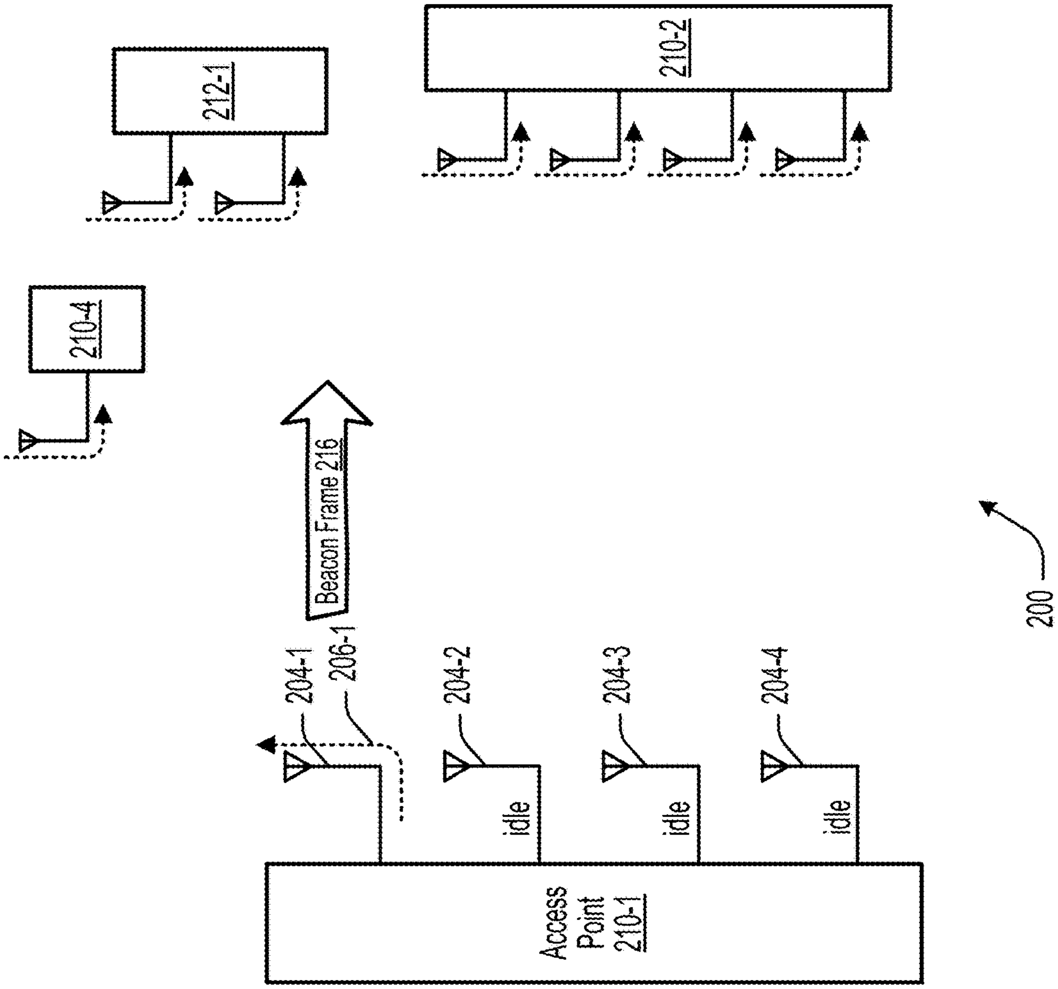
FIG. 2H illustrates an example transmission of a beacon frame from a first access point to a second access point and client devices while the first access point is operating in accordance with an uncorrelated transmission mode.

FIG. 2H illustrates an example transmission of a beacon frame 216 from access point 210-1 to access point 210-2 and client devices 212 while access point 210-1 is operating in accordance with an uncorrelated transmission mode, in accordance with some embodiments of the present invention. Prior to transmission of beacon frame 216, access point 210-1 place antenna 204-1 into an active state and antennas 204-2, 204-3, and 204-4 into an idle state (e.g., by switching the states of antennas 204-2, 204-3, and 204-4 when transitioning from the configuration of FIG. 2G). Access point 210-1 may then use antenna 204-1 to transmit signal 206-1 to communicate beacon frame 216 to access point 210-2 and client devices 212 in a SISO antenna arrangement. Signal processing at access point 210-2 and client devices 212 may be performed to recover beacon frame 216.

Figure 3A:
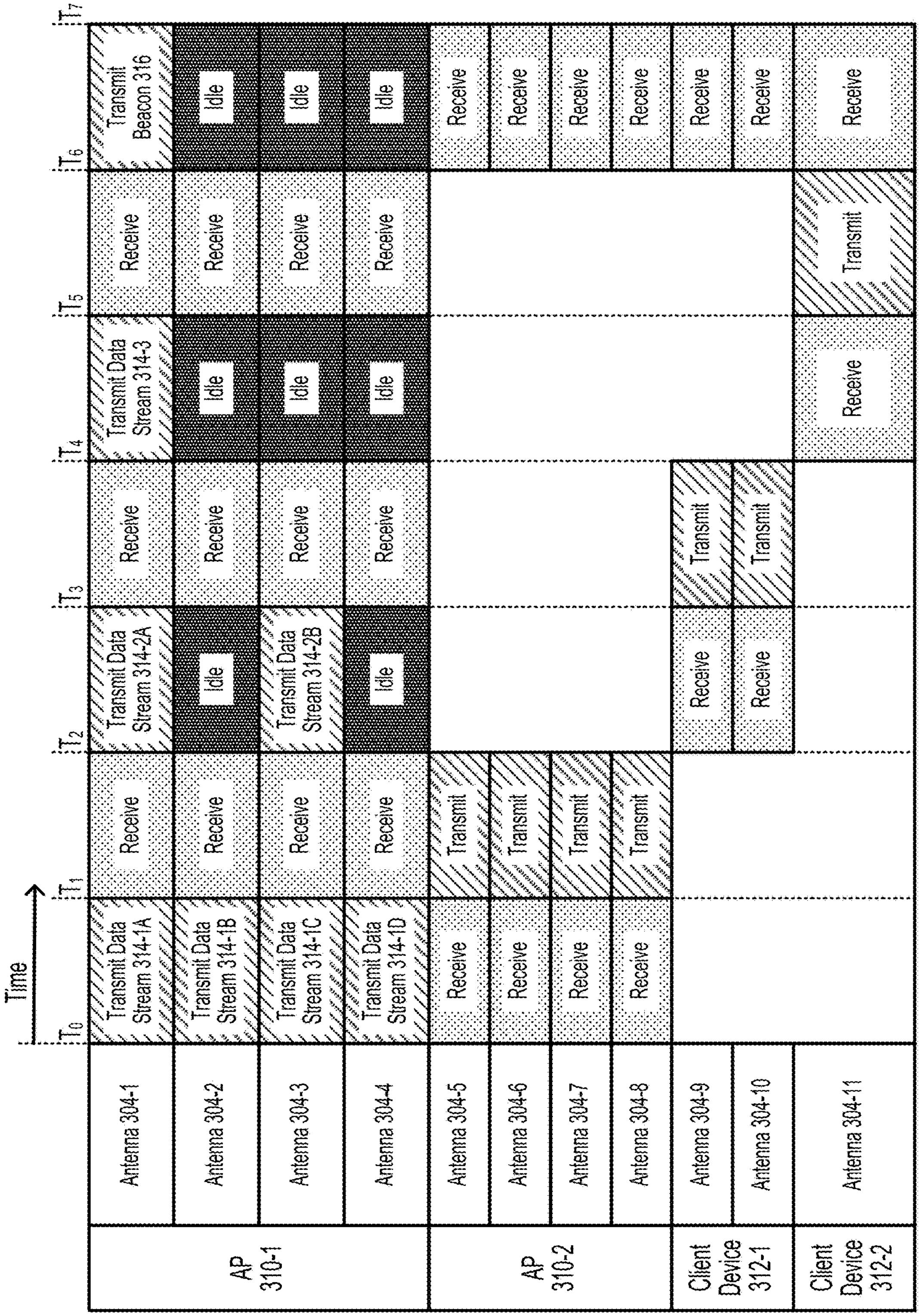
FIG. 3A illustrates an example timing diagram for operating access points and client devices within a wireless network.

FIG. 3A illustrates an example timing diagram for operating access points 310 and client devices 312 within a wireless network, in accordance with some embodiments of the present invention. In the illustrated example, access points 312 are operating in accordance with an uncorrelated transmission mode. During a time window between times $T_0$ and $T_1$, access point 310-1 determines that access point 310-2 includes four antennas, places each of antennas 304-1 to 304-4 into an active state, and uses antennas 304-1 to 304-4 to respectively transmit data streams 314-1A to 314-1D to access point 310-2. Access point 310-2 receives the transmitted signals at each of antennas 304-5 to 304-8 and recovers data streams 314-1A to 314-1D by performing signal processing on the received signals. During a time window between times $T_1$ and $T_2$, access point 310-2 determines that access point 310-1 includes four antennas, maintains each of antennas 304-5 to 304-8 in an active state, and uses antennas 304-5 to 304-8 to transmit data streams to access point 310-1. Access point 310-1 receives the transmitted signals at each of antennas 304-1 to 304-4 and recovers the data streams by performing signal processing on the received signals.

During a time window between times $T_2$ and $T_3$, access point 310-1 determines that client device 312-1 includes two antennas, maintains each of antennas 304-1 and 304-3 in an active state, switches each of antennas 304-2 and 304-4 from an active state to an idle state, and uses antennas 304-1 and 304-3 to respectively transmit data streams 314-2A and 314-2B to client device 312-1. Client device 312-1 receives the transmitted signals at each of antennas 304-9 and 304-10 and recovers data streams 314-2A and 314-2B by performing signal processing on the received signals. During a time window between times $T_3$ and $T_4$, client device 312-1 determines that access point 310-1 includes four antennas, maintains each of antennas 304-9 and 304-10 in an active state, and uses antennas 304-9 and 304-10 to transmit data streams to access point 310-1. Access point 310-1 receives the transmitted signals at each of antennas 304-1 to 304-4 and recovers the data streams by performing signal processing on the received signals.

During a time window between times $T_4$ and $T_5$, access point 310-1 determines that client device 312-2 includes one antenna, maintains antenna 304-1 in an active state, switches each of antennas 304-2 and 304-4 from an active state to an idle state, and uses antenna 304-1 to transmit data stream 314-3 to client device 312-2. Client device 312-2 receives the transmitted signal at antenna 304-11 and recovers data streams 314-3 by performing signal processing on the received signal. During a time window between times $T_5$ and $T_6$, client device 312-2 maintains antenna 304-11 in an active state and uses antennas 304-11 to transmit a data stream to access point 310-1. Access point 310-1 receives the transmitted signal at each of antennas 304-1 to 304-4 and recovers the data stream by performing signal processing on the received signals.

Figure 3B:
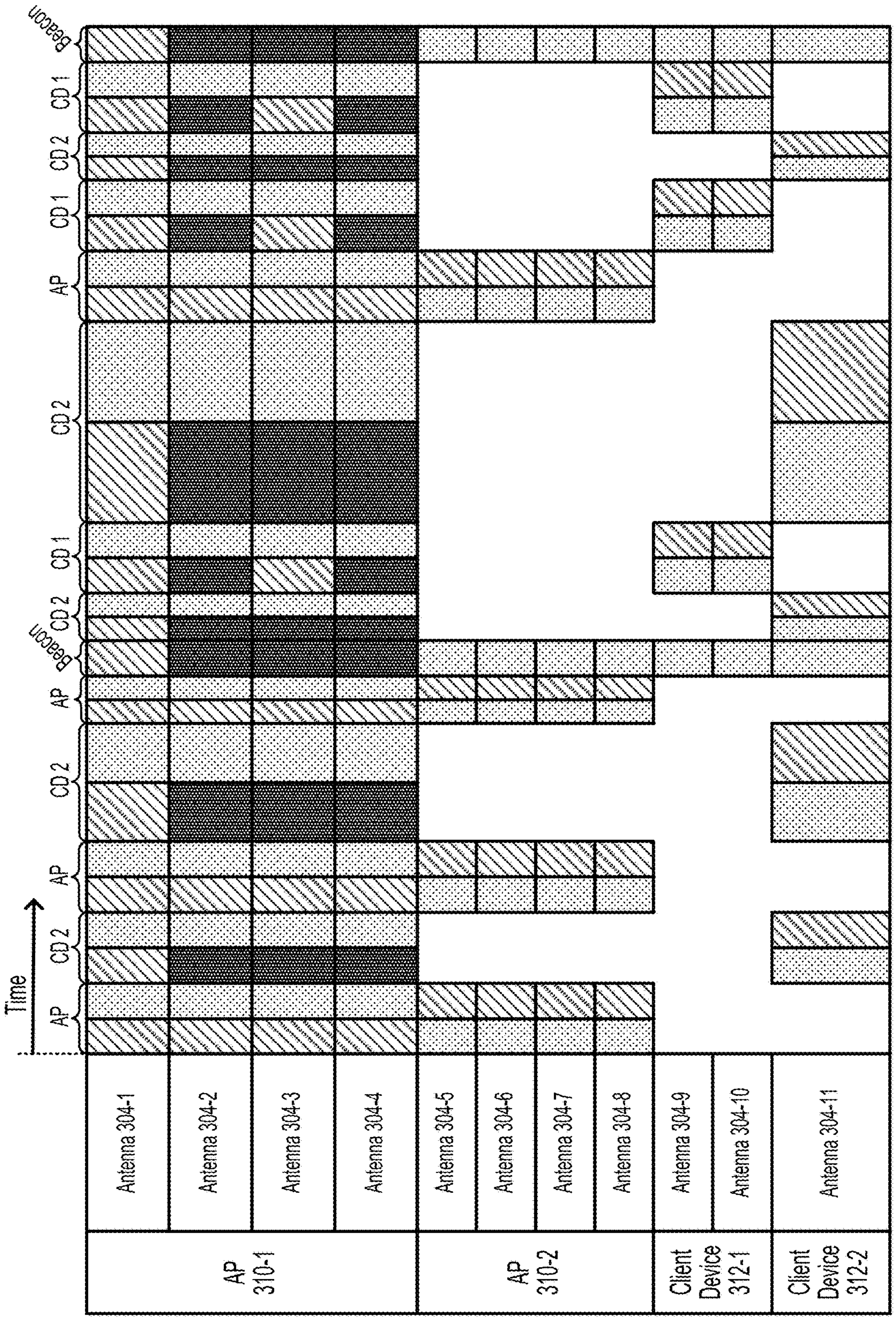
FIG. 3B illustrates an example timing diagram for operating access points and client devices within a wireless network.

FIG. 3B illustrates an example timing diagram for operating access points 310 and client devices 312 within a wireless network, in accordance with some embodiments of the present invention. FIG. 3B demonstrates the sequential manner in which access point 310-1 selectively transmits and receives between access point 310-2 and client devices 312. It can be observed that data bursts may vary in duration as well as sequence, and may be interposed by beacon frames. For example, in the illustrated sequence, access point 310-1 transmits data streams to access point 310-2, then client device 312-2, then access point 310-2, then client device 312-2, then access point 310-2, followed by a beacon frame to all devices, followed by data streams to client device 312-2, then client device 312-1, then client device 312-2, then access point 310-2, then client device 312-1, then client device 312-2, then client device 312-1, followed by a beacon frame to all devices. Accordingly, access point 310-1 may dynamically activate or deactivate antennas 304-1 to 304-4 based on the type of transmission (data or management), the number of antennas of the recipient device, and whether access point 310-1 is transmitting or receiving.

Figure 4A:
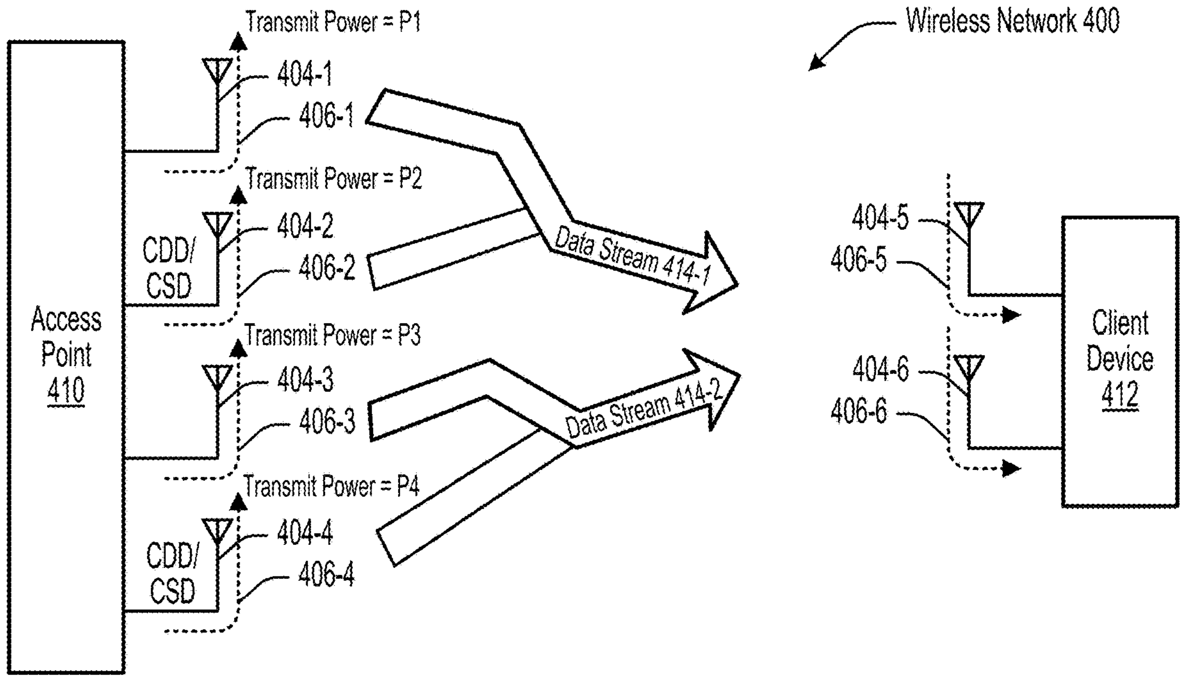
FIG. 4A illustrates an example transmission of data streams from an access point to a client device while the access point is operating in accordance with a correlated transmission mode.

FIG. 4A illustrates an example transmission of data streams 414 from access point 410 to client device 412 while access point 410 is operating in accordance with a correlated transmission mode, in accordance with some embodiments of the present invention. Prior to transmission of any data streams, access point 410 may determine the total number of antennas included in client device 412. Upon determining that client device 412 includes two antennas, access point 410 may place antennas 404-1 to 404-4 into an active state. Access point 410 may then use antennas 404-1 and 404-2 to respectively transmit signals 406-1 and 406-2 to communicate data stream 414-1 to client device 412. Signals 406-1 and 406-2 may be correlated with each other. For example, access point 410 may apply different cyclic delays to signals 406-1 and 406-2 in accordance with cyclic delay diversity (CDD) techniques or cyclically shift signals 406-1 and 406-2 in accordance with cyclic shift diversity (CSD) techniques. Accordingly, signal 406-2 may be a delayed or modified copy of signal 406-1.

Similarly, access point 410 may use antennas 404-3 and 404-4 to respectively transmit signals 406-3 and 406-4 to communicate data stream 414-2 to client device 412. Signals 406-3 and 406-4 may be correlated with each other. For example, access point 410 may apply different cyclic delays to signals 406-3 and 406-4 in accordance with CDD techniques or cyclically shift signals 406-3 and 406-4 in accordance with CSD techniques. Accordingly, signal 406-4 may be a delayed or modified copy of signal 406-3. Each of signals 406-1 to 406-4 may be received by each of antennas 404-5 and 404-6 as signals 406-5 and 406-6. Signal processing at client device 412 may be performed to recover each of data streams 414-1 and 414-2.

Figure 4B:
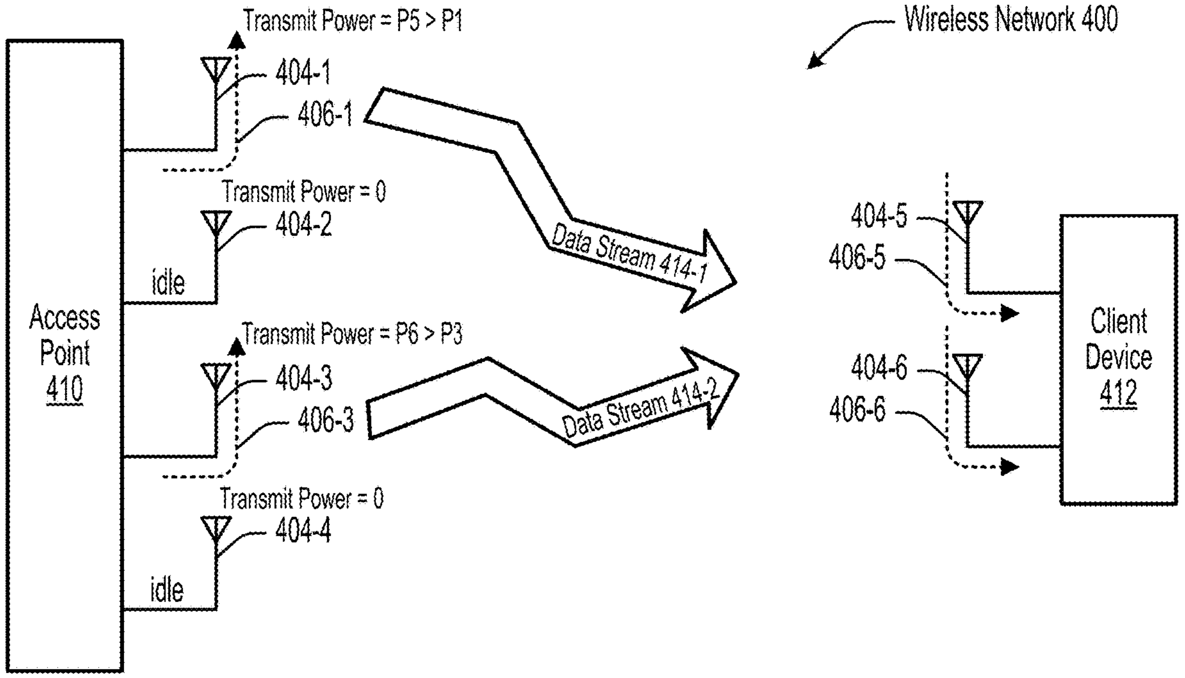
FIG. 4B illustrates an example transmission of data streams from an access point to a client device while the access point is operating in accordance with an uncorrelated transmission mode.

FIG. 4B illustrates an example transmission of data streams 414 from access point 410 to client device 412 while access point 410 is operating in accordance with an uncorrelated transmission mode, in accordance with some embodiments of the present invention. Prior to transmission of any data streams, access point 410 may determine the total number of antennas included in client device 412. Upon determining that client device 412 includes two antennas, access point 410 may place antennas 404-1 and 404-3 into an active state and antennas 404-2 and 404-4 into an idle state (e.g., by switching the states of antennas 404-2 and 404-4 when transitioning from the configuration of FIG. 4A). Access point 410 may then use antennas 404-1 and 404-3 to respectively transmit signals 406-1 and 406-3 to respectively communicate data streams 414-1 and 414-2 to client device 412. Signals 406-1 and 406-3 may be uncorrelated with each other. Each of signals 406-1 and 406-3 may be received by each of antennas 404-5 and 404-6 as signals 406-5 and 406-6. Signal processing at client device 412 may be performed to recover each of data streams 414-1 and 414-2.

While transmitting data streams 414 to client device 412, access point 410 may switch from the correlated transmission mode as shown in FIG. 4A to the uncorrelated transmission mode as shown in FIG. 4B. Thereafter, access point 410 may switch back to the uncorrelated transmission mode. Furthermore, access point 410 may adjust the transmit power of antennas 404-1 to 404-4 based on the transmission mode. For example, while access point 410 is operating in accordance with the correlated transmission mode, access point 410 may set the transmit powers of antennas 404-1, 404-2, 404-3, and 404-4 to P1, P2, P3, and P4, respectively. Upon switching from the correlated transmission mode to the uncorrelated transmission mode, access point 410 may set the transmit powers of antennas 404-1, 404-2, 404-3, and 404-4 to P5>P1, 0, P6>P3, and 0, respectively. Accordingly, access point 410 may increase the transmit powers of antennas 404-1 and 404-3 upon switching to the uncorrelated transmission mode and decrease the transmit powers of antennas 404-1 and 404-3 upon switching to the correlated transmission mode. In this manner, the range of access point 410 may be increased upon switching to the uncorrelated transmission mode.

Figure 5:
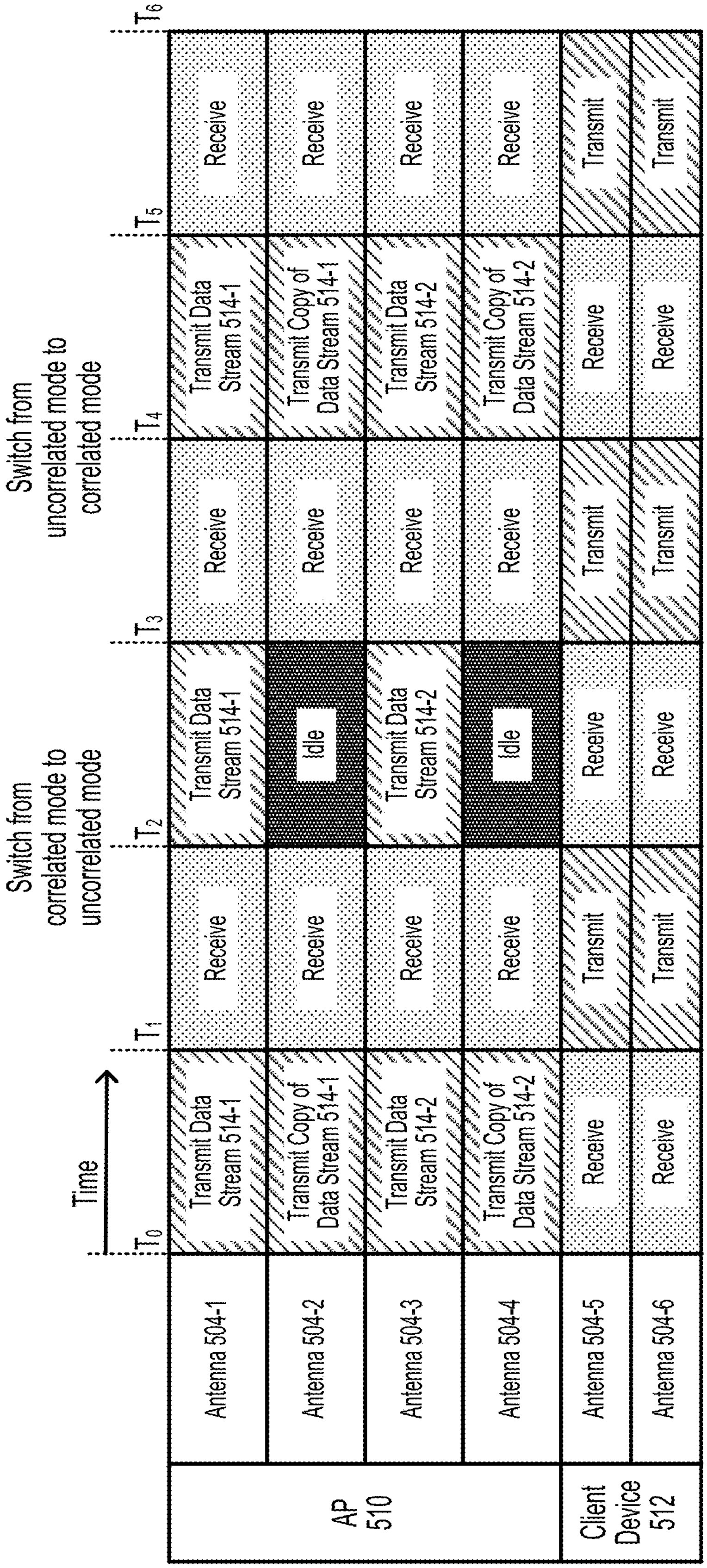
FIG. 5 illustrates an example timing diagram for operating an access point and a client device within a wireless network.

FIG. 5 illustrates an example timing diagram for operating access point 510 and client device 512 within a wireless network, in accordance with some embodiments of the present invention. In the illustrated example, access point 510 begins by operating in accordance with a correlated transmission mode. During a time window between times $T_0$ and $T_1$, access point 510 determines that client device 512 includes two antennas, places each of antennas 504-1 to 504-4 into an active state, uses antennas 504-1 and 504-2 to transmit a data stream 514-1 to client device 512, and uses antennas 504-3 and 504-4 to transmit a data stream 514-2 to client device 512. Client device 512 receives the transmitted signals at each of antennas 504-5 and 504-6 and recovers data streams 514-1 and 514-2 by performing signal processing on the received signals. During a time window between times $T_1$ and $T_2$, client device 512 determines that access point 510 includes four antennas, maintains each of antennas 504-5 and 504-6 in an active state, and uses antennas 504-5 and 504-6 to transmit data streams to access point 510. Access point 510 receives the transmitted signals at each of antennas 504-1 to 504-4 and recovers the data streams by performing signal processing on the received signals.

At time $T_2$, access point 510 switches from the correlated transmission mode to an uncorrelated transmission mode. During a time window between times $T_2$ and $T_3$, access point 510 determines that client device 512 includes two antennas, maintains each of antennas 504-1 and 504-3 in an active state, switches each of antennas 504-2 and 504-4 from an active state to an idle state, and uses antennas 504-1 and 504-3 to respectively transmit data streams 514-1 and 514-2 to client device 512. Client device 512 receives the transmitted signals at each of antennas 504-5 and 504-6 and recovers data streams 514-1 and 514-2 by performing signal processing on the received signals. During a time window between times $T_3$ and $T_4$, client device 512 determines that access point 510 includes two antennas, maintains each of antennas 504-5 and 504-6 in an active state, and uses antennas 504-5 and 504-6 to transmit data streams to access point 510. Access point 510 receives the transmitted signals at each of antennas 504-1 to 504-4 and recovers the data streams by performing signal processing on the received signals.

At time $T_4$, access point 510 switches from the uncorrelated transmission mode to the correlated transmission mode. During a time window between times $T_4$ and $T_5$, access point 510 determines that access point 510 includes two antennas, maintains each of antennas 504-1 to 504-4 in an active state, uses antennas 504-1 and 504-2 to transmit data stream 514-1 to client device 512, and uses antennas 504-3 and 504-4 to transmit data stream 514-2 to client device 512. Client device 512 receives the transmitted signals at each of antennas 504-5 and 504-6 and recovers data streams 514-1 and 514-2 by performing signal processing on the received signals. During a time window between times $T_5$ and $T_6$, client device 512 determines that access point 510 includes four antennas, maintains each of antennas 504-5 and 504-6 in an active state, and uses antennas 504-5 and 504-6 to transmit data streams to access point 510. Access point 510 receives the transmitted signals at each of antennas 504-1 to 504-4 and recovers the data streams by performing signal processing on the received signals.

Figure 6:
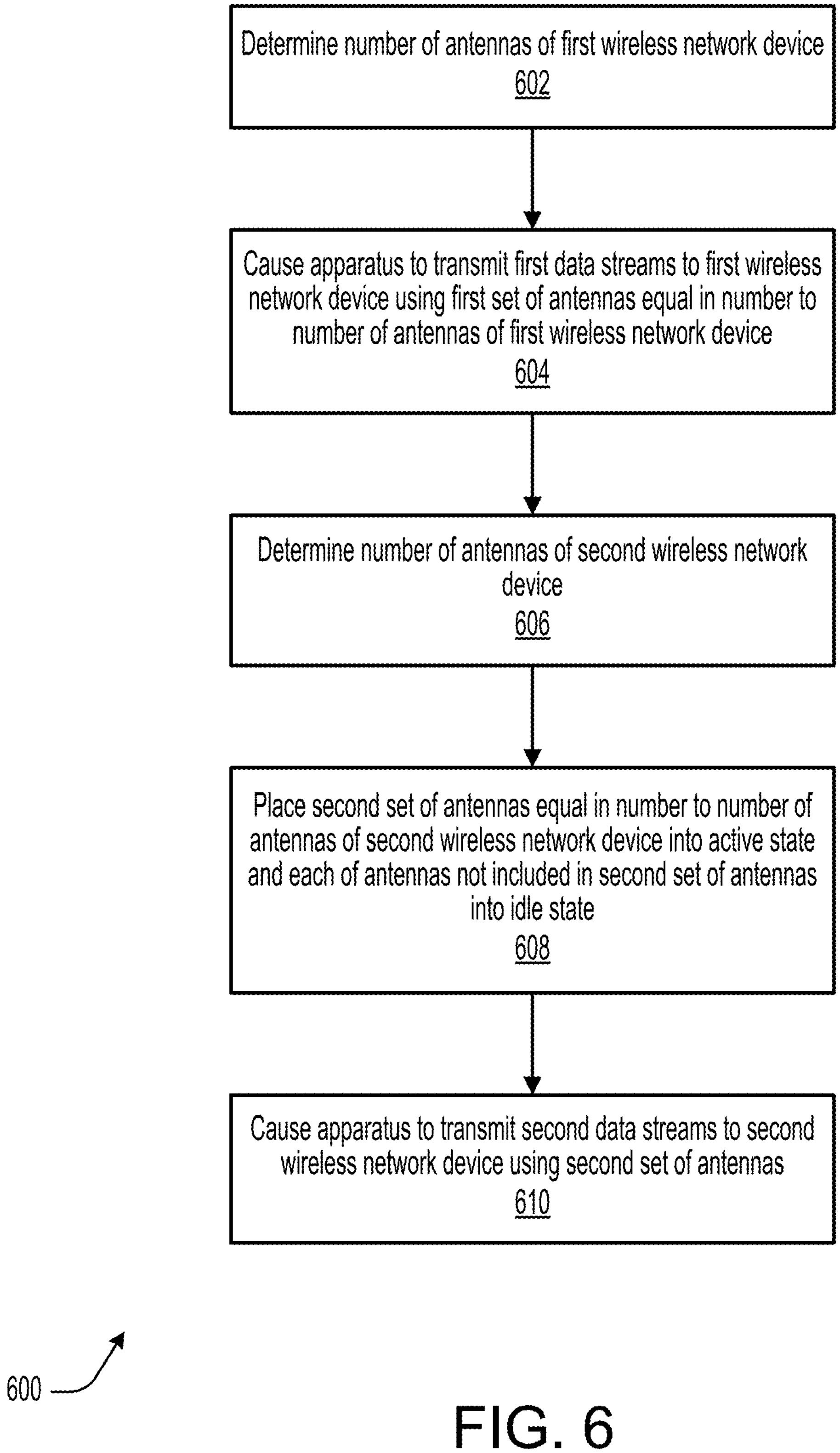
FIG. 6 illustrates an example method of operating an access point within a wireless network.

FIG. 6 illustrates an example method 600 of operating an access point (e.g., access points 110, 210-1, 310-1, 410, 510) within a wireless network (e.g., wireless networks 200, 400), in accordance with some embodiments of the present invention. One or more steps of method 600 may be omitted during performance of method 600, and steps of method 600 may be performed in any order and/or in parallel. One or more steps of method 600 may be performed by one or more processors. Method 600 may be implemented as a computer-readable medium or computer program product comprising instructions which, when the program is executed by one or more computers, cause the one or more computers to carry out the steps of method 600. Such computer program products can be transmitted, over a wired or wireless network, in a data carrier signal carrying the computer program product.

At step 602, the access point determines a number of antennas (e.g., antennas 204, 304, 404, 504) of a first wireless network device (e.g., access points 110, 210-2, 310-2, 410, 510) operating within the wireless network. The access point may include a plurality of antennas (e.g., antennas 104, 204, 304, 404, 504) and a hardware processor (e.g., hardware processor 102). The first wireless network device may be a second access point. A number of antennas of the plurality of antennas may be greater than or equal to four. In various examples, the number of antennas of the plurality of antennas may be 2, 4, 6, 8, 10, 16, 32, or 64, among other possibilities.

At step 604, the access point transmits a first set of data streams (e.g., data streams 214-1, 314-1, 414, 514) to the first wireless network device using a first set of the plurality of antennas equal in number to the number of antennas of the first wireless network device.

At step 606, the access point determines a number of antennas of a second wireless network device (e.g., client devices 212-1, 312-1, 412, 512) operating within the wireless network. The number of antennas of the second wireless device may be less than the number of antennas of the first wireless network device. The second wireless network device may be a client device.

At step 608, the access point places a second set of the plurality of antennas equal in number to the number of antennas of the second wireless network device into an active state and each of the plurality of antennas not included in the second set of the plurality of antennas into an idle state.

At step 610, the access point transmits a second set of data streams (e.g., data streams 214-2, 314-2, 414, 514) to the second wireless network device using the second set of the plurality of antennas.

In some examples, method 600 may further include the access point determining a number of antennas of a third wireless network device (e.g., client devices 212-2, 312-2, 412, 512). The number of antennas of the third wireless device may be less than the number of antennas of the second wireless network device. In some examples, method 600 may further include the access point placing a third set of the plurality of antennas equal in number to the number of antennas of the third wireless network device into the active state and each of the plurality of antennas not included in the third set of the plurality of antennas into the idle state. In some examples, method 600 may further include the access point transmitting one or more third data streams (e.g., data streams 214-3, 314-3, 414, 514) to the third wireless network device using the third set of the plurality of antennas.

In some examples, method 600 may further include causing the access point to switch from an uncorrelated transmission mode to a correlated transmission mode. In response to causing the access point to switch from the uncorrelated transmission mode to the correlated transmission mode, the access point may place each of the plurality of antennas into the active state. In some examples, method 600 may further include the access point continuing to transmit the second set of data streams to the second wireless network device but using each of the plurality of antennas, where signals transmitted by at least two of the plurality of antennas are correlated.

In some examples, method 600 may further include the access point applying different cyclic delays to the signals transmitted by the at least two of the plurality of antennas in accordance with CDD techniques. In some examples, method 600 may further include the access point cyclically shifting the signals transmitted by the at least two of the plurality of antennas in accordance with CSD techniques.

In some examples, method 600 may further include the access point placing a single antenna of the plurality of antennas into the active state and each of the plurality of antennas other than the single antenna into the idle state. In some examples, method 600 may further include the access point transmitting a beacon frame (e.g., beacon frames 216, 316) to the first wireless network device and the second wireless network device using the single antenna.

Figure 7:
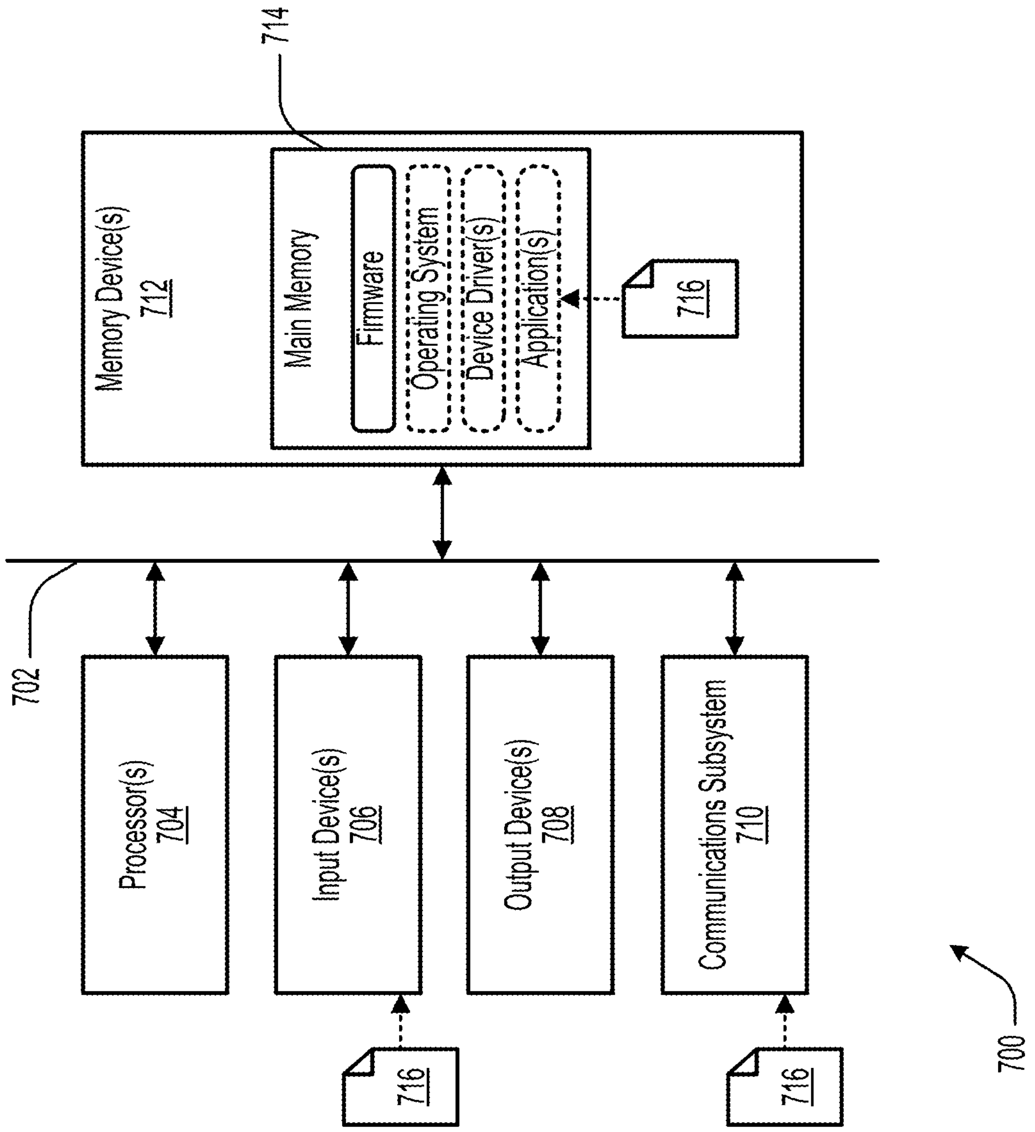
FIG. 7 illustrates an example computer system comprising various hardware elements.

FIG. 7 illustrates an example computer system 700 comprising various hardware elements, in accordance with some embodiments of the present invention. Computer system 700 may be incorporated into or integrated with devices described herein and/or may be configured to perform some or all of the steps of the methods provided by various embodiments. For example, in various embodiments, computer system 700 may be incorporated into access points 110, 210-2, 310-2, 410, 510 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s)

704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 700 may be communicatively coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses that connect the pins of the hardware elements of computer system 700. For example, communication medium 702 may include a bus that connects processor(s) 704 with main memory 714, referred to as a system bus, and a bus that connects main memory 714 with input device(s) 706 or output device(s) 708, referred to as an expansion bus. The system bus may itself consist of several buses, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 704 may include one or more multi-core processors, in which each core may read and execute program instructions concurrently with the other cores, increasing speed for programs that support multithreading.

Input device(s) 706 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, a haptic or tactile device, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be controlled using control signals generated by computer system 700.

Communications subsystem 710 may include hardware components for connecting computer system 700 to systems or devices that are located external to computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the address and data buses of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as RAM, such as dynamic random-access memory (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 716, which are executable by computer system 700. In one example, such instructions 716 may be received by computer system 700 using communications subsystem 710 (e.g., via a wireless or wired signal that carries instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 700. For example, the non-transitory computer-readable medium may be one of memory device(s) 712 (as shown in FIG. 7). In some cases, the non-transitory computer-readable medium may be separate from computer system 700. In one example, the non-transitory computer-readable medium may be a removable medium provided to input device(s) 706 (as shown in FIG. 7), such as those described in reference to input device(s) 706, with instructions 716 being read into computer system 700 by input device(s) 706. In another example, the non-transitory computer-readable medium may be a component of a remote electronic device, such as a mobile phone, that may wirelessly transmit a data signal that carries instructions 716 to computer system 700 and that is received by communications subsystem 710 (as shown in FIG. 7).

Instructions 716 may take any suitable form to be read and/or executed by computer system 700. For example, instructions 716 may be source code (written in a human-readable programming language such as Java, C, C++, C#, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An access point configured to operate within a wireless network with multiple other wireless network devices, the access point comprising:

a plurality of antennas including a first antenna, a second antenna, a third antenna, and a fourth antenna; and a hardware processor coupled to the plurality of antennas, the hardware processor configured to:

determine that a first wireless network device operating within the wireless network includes four antennas;

place the first antenna, the second antenna, the third antenna, and the fourth antenna into an active state;

cause the access point to transmit a first set of data streams to the first wireless network device using the first antenna, the second antenna, the third antenna, and the fourth antenna;

determine that a second wireless network device operating within the wireless network includes two antennas;

place the first antenna and the second antenna into the active state and the third antenna and the fourth antenna into an idle state; and cause the access point to transmit a second set of data streams to the second wireless network device using the first antenna and the second antenna;

wherein the access point is operating in accordance with an uncorrelated transmission mode such that signals transmitted by the first antenna are uncorrelated with signals transmitted by the second antenna, the signals transmitted by the second antenna are uncorrelated with signals transmitted by the third antenna, and the signals transmitted by the third antenna are uncorrelated with signals transmitted by the fourth antenna.

2. The access point of claim 1, wherein the hardware processor is further configured to:

determine that a third wireless network device operating within the wireless network includes one antenna;

place the first antenna into the active state and the second antenna, the third antenna, and the fourth antenna into the idle state; and cause the access point to transmit a third data stream to the third wireless network device using the first antenna.

3. The access point of claim 1, wherein the first network device is a second access point, the access point being a first access point, and wherein the second network device is a client device.

4. The access point of claim 1, wherein the hardware processor is further configured to:

cause the access point to switch from the uncorrelated transmission mode to a correlated transmission mode;

in response to causing the access point to switch from the uncorrelated transmission mode to the correlated transmission mode, place each of the plurality of antennas into the active state; and cause the access point to continue transmitting the second set of data streams to the second wireless network device but using each of the plurality of antennas, wherein signals transmitted by at least two of the plurality of antennas are correlated.

5. An apparatus comprising:

a plurality of antennas;

one or more hardware processors; and one or more non-transitory computer readable media storing processor executable instructions which, when executed using the one or more hardware processors, cause the apparatus to perform operations comprising:

determining a number of antennas of a first wireless network device;

transmitting a first set of data streams to the first wireless network device using a first set of the plurality of antennas equal in number to the number of antennas of the first wireless network device;

determining a number of antennas of a second wireless network device, the number of antennas of the second wireless device being less than the number of antennas of the first wireless network device;

placing a second set of the plurality of antennas equal in number to the number of antennas of the second wireless network device into an active state and each of the plurality of antennas not included in the second set of the plurality of antennas into an idle state; and transmitting a second set of data streams to the second wireless network device using the second set of the plurality of antennas.

6. The apparatus of claim 5, wherein the one or more non-transitory computer readable media store processor executable instructions which, when executed using the one or more hardware processors, cause the apparatus to perform operations comprising:

determining a number of antennas of a third wireless network device, the number of antennas of the third wireless device being less than the number of antennas of the second wireless network device;

placing a third set of the plurality of antennas equal in number to the number of antennas of the third wireless network device into the active state and each of the plurality of antennas not included in the third set of the plurality of antennas into the idle state; and transmitting one or more third data streams to the third wireless network device using the third set of the plurality of antennas.

7. The apparatus of claim 5, wherein the apparatus is an access point.

8. The apparatus of claim 7, wherein the first network device is a second access point, the apparatus being a first access point, and wherein the second network device is a client device.

9. The apparatus of claim 5, wherein a number of antennas of the plurality of antennas is greater than or equal to four.

10. The apparatus of claim 5, wherein the one or more non-transitory computer readable media store processor executable instructions which, when executed using the one or more hardware processors, cause the apparatus to perform operations comprising:

switching from an uncorrelated transmission mode to a correlated transmission mode;

in response to causing the apparatus to switch from the uncorrelated transmission mode to the correlated transmission mode, placing each of the plurality of antennas into the active state; and causing the apparatus to continue transmitting the second set of data streams to the second wireless network device but using each of the plurality of antennas, wherein signals transmitted by at least two of the plurality of antennas are correlated.

11. The apparatus of claim 10, wherein the one or more non-transitory computer readable media store processor executable instructions which, when executed using the one or more hardware processors, cause the apparatus to perform operations comprising:

applying different cyclic delays to the signals transmitted by the at least two of the plurality of antennas in accordance with cyclic delay diversity (CDD) techniques; or cyclically shifting the signals transmitted by the at least two of the plurality of antennas in accordance with cyclic shift diversity (CSD) techniques.

12. The apparatus of claim 5, wherein the one or more non-transitory computer readable media store processor executable instructions which, when executed using the one or more hardware processors, cause the apparatus to perform operations comprising:

placing a single antenna of the plurality of antennas into the active state and each of the plurality of antennas other than the single antenna into the idle state; and transmitting a beacon frame to the first wireless network device and the second wireless network device using the single antenna.

13. A computer-implemented method comprising:

determining a number of antennas of a first wireless network device;

causing an apparatus to transmit a first set of data streams to the first wireless network device using a first set of a plurality of antennas equal in number to the number of antennas of the first wireless network device;

determining a number of antennas of a second wireless network device, the number of antennas of the second wireless device being less than the number of antennas of the first wireless network device;

placing a second set of the plurality of antennas equal in number to the number of antennas of the second wireless network device into an active state and each of the plurality of antennas not included in the second set of the plurality of antennas into an idle state; and causing the apparatus to transmit a second set of data streams to the second wireless network device using the second set of the plurality of antennas.

14. The computer-implemented method of claim 13, wherein the method further comprises:

determining a number of antennas of a third wireless network device, the number of antennas of the third wireless device being less than the number of antennas of the second wireless network device;

placing a third set of the plurality of antennas equal in number to the number of antennas of the third wireless network device into the active state and each of the plurality of antennas not included in the third set of the plurality of antennas into the idle state; and causing the apparatus to transmit one or more third data streams to the third wireless network device using the third set of the plurality of antennas.

15. The computer-implemented method of claim 13, wherein the apparatus is an access point.

16. The computer-implemented method of claim 15, wherein the first network device is a second access point, the apparatus being a first access point, and wherein the second network device is a client device.

17. The computer-implemented method of claim 13, wherein a number of antennas of the plurality of antennas is greater than or equal to four.

18. The computer-implemented method of claim 13, wherein the method comprises:

causing the apparatus to switch from an uncorrelated transmission mode to a correlated transmission mode;

in response to causing the apparatus to switch from the uncorrelated transmission mode to the correlated transmission mode, placing each of the plurality of antennas into the active state; and causing the apparatus to continue transmitting the second set of data streams to the second wireless network device but using each of the plurality of antennas, wherein signals transmitted by at least two of the plurality of antennas are correlated.

19. The computer-implemented method of claim 18, wherein the method comprises:

applying different cyclic delays to the signals transmitted by the at least two of the plurality of antennas in accordance with cyclic delay diversity (CDD) techniques; or cyclically shifting the signals transmitted by the at least two of the plurality of antennas in accordance with cyclic shift diversity (CSD) techniques.

20. The computer-implemented method of claim 13, wherein the method comprises:

placing a single antenna of the plurality of antennas into the active state and each of the plurality of antennas other than the single antenna into the idle state; and causing the apparatus to transmit a beacon frame to the first wireless network device and the second wireless network device using the single antenna.

* * * * *